United States Patent [19]

Althoff et al.

[11] Patent Number: 5,440,487
[45] Date of Patent: Aug. 8, 1995

[54] PROCESS AND DEVICE FOR DEALING WITH ERRORS IN ELECTRONIC CONTROL DEVICES

[75] Inventors: Heinz-Jürgen Althoff, Sinzheim; Guenter Driedger, Oberriexingen; Klaus Meder, Ditzingen; Jürgen Schuh, Markgroeningen; Manfred Stahl, Stuttgart; Karl Viehmann, Murr; Eberhard Weiss, Hemmingen; Jürgen Neumann, Lueneburg; Bert Zorbach, Gerlingen, all of Germany

[73] Assignee: Robert Bosch GmbH, Stuttgart, Germany

[21] Appl. No.: 240,687

[22] PCT Filed: Oct. 31, 1992

[86] PCT No.: PCT/DE92/00909
§ 371 Date: Jul. 25, 1994
§ 102(e) Date: Jul. 25, 1994

[87] PCT Pub. No.: WO93/09020
PCT Pub. Date: May 13, 1993

[30] Foreign Application Priority Data
Nov. 5, 1991 [DE] Germany .................. 41 36 338.8

[51] Int. Cl.⁶ .............. G06F 11/00; G05B 9/03; B62D 7/14
[52] U.S. Cl. .............. 364/424.05; 364/424.03; 364/571.01; 303/122; 180/79.1
[58] Field of Search .......... 364/424.05, 424.03, 364/424.01, 551.01, 571.01, 571.04, 579, 580, 131, 133; 371/67.1; 303/92, 94, 109; 180/79.1, 140, 141, 142; 60/404, 405

[56] References Cited

U.S. PATENT DOCUMENTS

| | | | |
|---|---|---|---|
| 4,032,757 | 6/1977 | Eccles | 364/431.02 |
| 4,546,437 | 10/1985 | Bleckmann et al. | 364/426.01 |
| 4,621,327 | 11/1986 | Dolph et al. | 364/424.05 |
| 4,687,214 | 8/1987 | Uno | 180/141 |
| 4,782,907 | 11/1988 | Morishita et al. | 180/140 |
| 4,953,445 | 9/1990 | Kervagoret et al. | 60/404 |

FOREIGN PATENT DOCUMENTS 3825280 1/1990 Germany .

Primary Examiner—Kevin J. Teska
Assistant Examiner—Tan Nguyen
Attorney, Agent, or Firm—Michael J. Striker

[57] ABSTRACT

The invention proposes a process for error recovery in electronic control devices as well as apparatus for controlling the steering angle of the rear wheels of a motor vehicle. The control device controls an actuating member to which is connected a safety device. In the main operation of the control device, transmitter signals are detected, actuating values are calculated and the actuating member is controlled corresponding to the calculated values. The calculated actuating values and the detected transmitter signals are checked for consistency. On the basis of the checked values, a decision is made as to whether to continue running the main program or resort to one of two emergency measures. In the first emergency measure, the safety device is activated and the control of the actuating member is switched off. In the second emergency measure, the signals of transmitters continue to be detected and actuating values are calculated from these signals. Before adjusting the actuating member, the calculated actuating values are multiplied by a factor decreasing over time to achieve a gradual damping of the actuating amplitude of the actuating member.

22 Claims, 12 Drawing Sheets

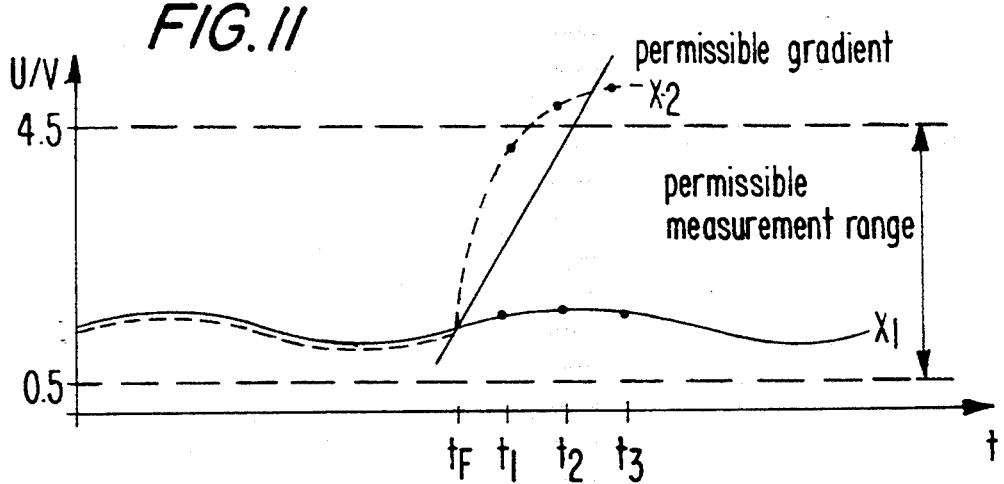
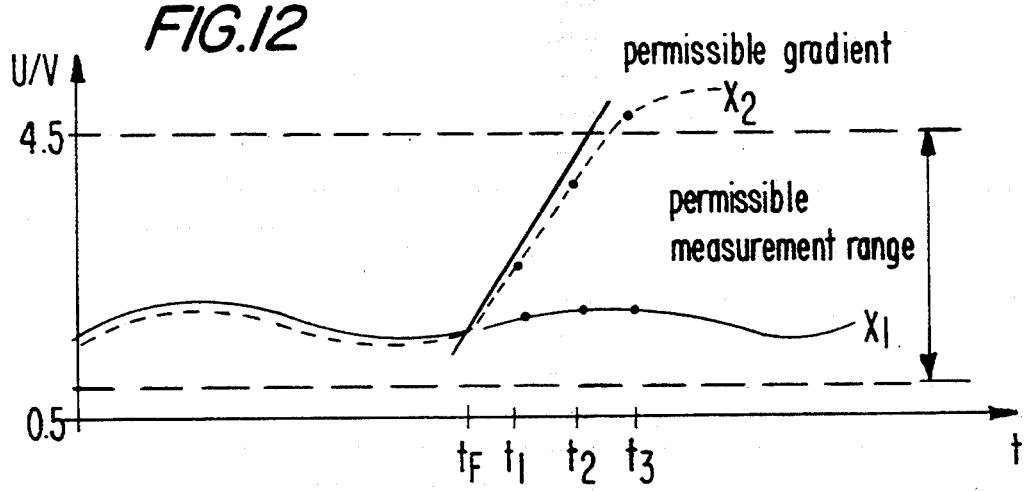
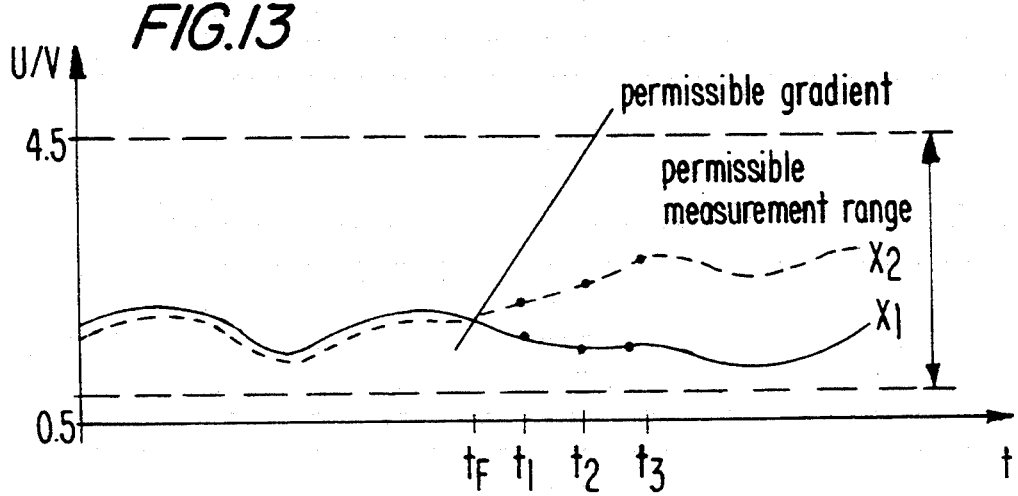

PROCESS AND DEVICE FOR DEALING WITH ERRORS IN ELECTRONIC CONTROL DEVICES

PRIOR ART

The invention proceeds from a process and an apparatus for error control or error recovery in electronic control devices according to the generic part of the main claim. A process and an apparatus for error recovery in an electronic control device is already known from DE 38 25 280 A1. The control device is provided, e.g., for controlling rear axle steering in a motor vehicle. Two emergency running measures are provided in the event of an error. For a relatively grave error, one emergency running measure consists in that the rear wheels are maintained in the last adjusted position, i.e. that position adjusted immediately prior to the occurrence of the error. The emergency running measure for a relatively minor error consists in returning the deflected rear wheels to the neutral or zero position in a purposeful manner and at final speed.

ADVANTAGES OF THE INVENTION

The process, according to the invention, with the characterizing features of the main claim has the advantage over the prior art that in the event of a relatively minor error an emergency program is started in which regulating variables or actuating values continue to be calculated for the actuating member as in the main program. These actuating values are multiplied by a factor which decreases over time from the moment the emergency program begins to run, resulting in a gradual fading or damping of the actuating amplitude of the actuating member. A smooth transition is effected from a deflected state of the actuating member to the neutral position of the actuating member. In this way, when a relatively minor error occurs, the control of the actuating member can be cut off gently without a drastic change in the control response. As concerns the control of rear wheel steering of a motor vehicle in particular, the gentle disengagement of rear wheel steering in an emergency situation is safer, since the driving behavior of the vehicle does not change abruptly.

Advantageous further developments and improvements of the process indicated in the main claim are made possible by the steps contained in the subclaims. To check for consistency of the detected transmitter signals, it is particularly advantageous to check the detected transmitter signals against predetermined values to determine whether or not a permissible signal range has been exceeded and/or to compare the detected transmitter signals with the detected transmitter signals of the redundant transmitter which is provided in addition. Accordingly, in many cases the defective transmitter can be definitely identified and the appropriate emergency measure can then be instituted.

Further, it is advantageous for checking the consistency of the detected transmitter signals to compare the rate of change of the detected transmitter signals with predetermined values as a function of predetermined quantities. This step enables early detection of an error so that the appropriate emergency measure can be implemented more promptly.

For checking the consistency of the detected transmitter signals, it is also advantageous to compare the detected transmitter signals with values derived from detected transmitter signals of transmitters supplying equivalent information. This enables more reliable detection of an error for a transmitter for which there is no redundant transmitter.

Further, it is advantageous for consistency checks to compare the number of detected errors with predetermined values and to include different errors in the same count when these errors are attributed to an identical source and to run one of the emergency programs only when the number of detected errors has reached a predetermined value. Running an emergency program only after repeated errors are detected prevents superfluous running of an emergency program due to a temporary disturbance, e.g. EMC disturbance. By counting together different errors attributed to the same cause, the emergency measure can be carried out faster than when errors are evaluated as different, independent errors.

The activation of the safety device in the second emergency program and the interruption of the control of the actuator after a given time is likewise advantageous, since a state of safety is achieved for the control system and the microcomputer can then carry out further tests and diagnostic programs, for example. After the control device has been recognized as being once more free of errors, it is possible to gently switch on the rear wheel steering again. This may be done by gradually increasing the calculated steering amplitudes to those of the main program.

For the apparatus controlling the steering angle of the rear wheels of a motor vehicle, it is also advantageous to provide an emergency program in which the actuating values are calculated as in the main program. These actuating values are also multiplied by a factor which decreases over time resulting in a gradual damping of the actuating amplitude of the actuating member.

Further, it is advantageous that the first emergency program, in which the control of the actuating member is shut off immediately, is always run when the consistency check determines that none of the transmitters supplying values for the actual position of the actuating member are operating correctly and/or the values calculated by the microcomputers deviate beyond a predetermined threshold. In this event, it is advantageous to shut off the control immediately because the actuator position is absolutely necessary for a controlled adjustment of the actuating member.

If it is detected in the consistency check that none of the transmitters for the steering angle are operating correctly, it is advantageous to run the third emergency program. In this case, the control system still maintains control over the actual position value so that the adjustment of the actuating member can still be returned to the neutral position to achieve a more favorable driving behavior.

It is also advantageous to use two microcomputers with different semiconductor structures and/or other differences for the apparatus for controlling the rear wheel steering. This reduces the likelihood of an undetected error occurring simultaneously in both microcomputers.

It is likewise advantageous to install different programs in the two microcomputers to prevent the simultaneous occurrence of an undetected error in both microcomputers.

DRAWING

Two embodiment examples of the invention are shown in the drawing and described in more detail in the following description.

FIG. 11 shows the signal curves of two transmitters for the actual position value of an actuating member at the first occurrence of an error;

FIG. 12 shows the signal curves of two transmitters for the actual position value of an actuating member at the second occurrence of an error;

FIG. 13 shows the signal curves of two transmitters for the actual position value of an actuating member at the third occurrence of an error;

DESCRIPTION OF THE INVENTION

Figure 1:
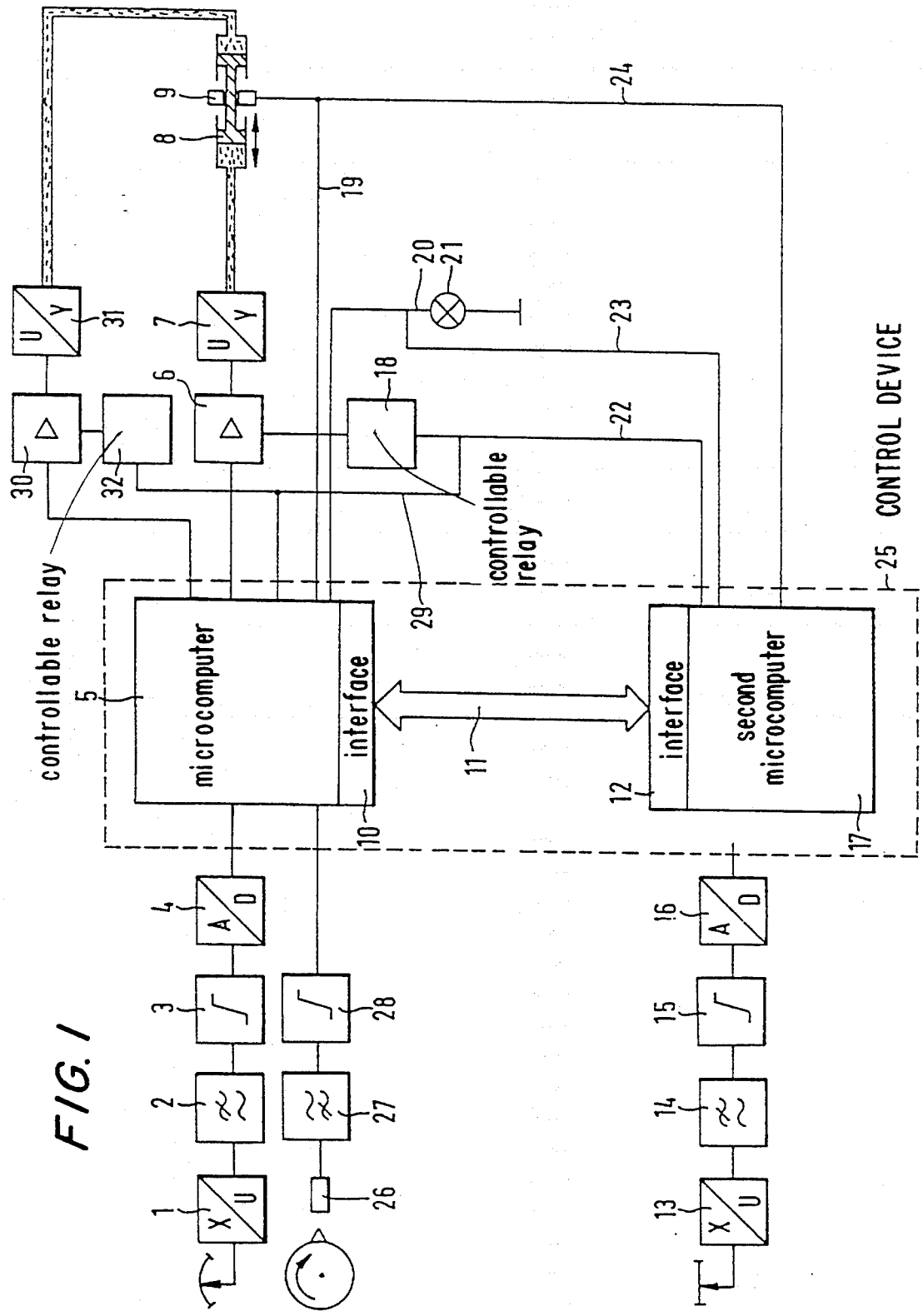
FIG. 1 shows a schematic view of a control device for controlling rear wheel steering.

FIG. 1 shows an embodiment form of a control device 25 for controlling rear wheel steering. This figure shows a microcomputer 5 containing such important elements of a microcomputer as the RAM and ROM of a central microprocessor, input/output modules, and an interface 10. The ROM contains a main program and the emergency programs. A bus connection 11 leads from interface 10 to the interface 12 of a second microcomputer 17. Instead of connecting the two microcomputers via interfaces 10, 12, certain ports of the microcomputers 5, 17, serial interfaces or a dual-port RAM can also be used to connect the two microcomputers 5, 17. The latter also includes, among others, a RAM and a ROM, a central microprocessor, and input/output modules. Another main program and other emergency programs are stored in its ROM. The two microcomputers 5, 17 can exchange data via tile bus connection 11. Instead of providing individual RAM modules in both microcomputers 5, 17, it is also possible to use a dual-port RAM module which is accessed by both microcomputers 5, 17. The signals of a steering angle sensor 1 are supplied to microcomputer 5 after filtering by a filter 2, limiting by a limiter 3 and A/D conversion by an A/D converter 4. The signal of a wheel speed sensor 26 is also fed to the microcomputer 5 via different signal processing stages such as a filter 27 and limiter 28. The signal of a displacement pickup 13 for the position of a rear axle actuator 8 is supplied to microprocessor 17 after being processed by a filter 17, limiter 15, and A/D converter 16.

Additional transmitters with the respective signal chains can be supplied to the microcomputers 5, 17. Sensors suitable for rear wheel steering are, for example, acceleration sensors, additional wheel revolution sensors, speed sensors, temperature and pressure sensors for the hydraulic system, and sensors for precision adjustment of the steering angle. In addition, some of the safety-related sensors, e.g. the steering angle sensor 1 and displacement pickup 13 for the position of the rear axle actuating member 8, and the speed sensor 26, can be duplicated. If the individual control devices of the motor vehicle are linked by a bus system, e.g. CAN bus, it is also possible for the sensor signals supplied to these control devices to be transmitted to the control device 25 via a CAN bus.

Two actuators 7 and 31 constructed as proportional valves are provided for adjustment of the rear axle actuator 8. The calculated actuating values are supplied to these actuators 7 and 31 via output modules in microcomputer 5 after amplification in the output stages 6, 30. A retaining brake 9 which can be activated by microcomputer 5 via a first connection line 19 and by microcomputer 17 via a second connection line 24 is provided for locking the rear axle actuator 8. For safety purposes, shut-off valves and test valves can also be arranged in the hydraulic system. These valves are connected with microcomputers 5, 17 and activate the retaining brake 9 by shutting off the system pressure. An error light 21 is connected to microcomputer 5 via connection line 20 and to microcomputer 17 via connection line 23. Two controllable relays 18, 32 are connected with the microcomputer 5, 17 via connection lines 22 and 29. The output stages 6, 32 can accordingly be cut off from the power supply.

The operation of the arrangement shown in FIG. 1 for controlling rear wheel steering is explained in the following with reference to FIGS. 2 to 8. The example for rear wheel steering relates to the four-wheel steering in a passenger automobile. The front wheels are adjusted by a mechanical arrangement as in conventional two-wheel steering. The adjustment of the rear axle must then be adapted to the steering angle of the steering wheel depending on the speed of the vehicle and the driving situation. For example, a parallel adjustment of the front and rear wheels is advisable when parking, whereas it is advisable to turn the front wheels and rear wheels in different steering angle directions to achieve smaller turning circles. When traveling at high speeds and in reverse, the rear axle must also be adjusted differently depending on the deflections of the steering angle. Therefore, different calculating principles should be used for controlling the rear wheel steering depending on the driving situation.

Figure 2:
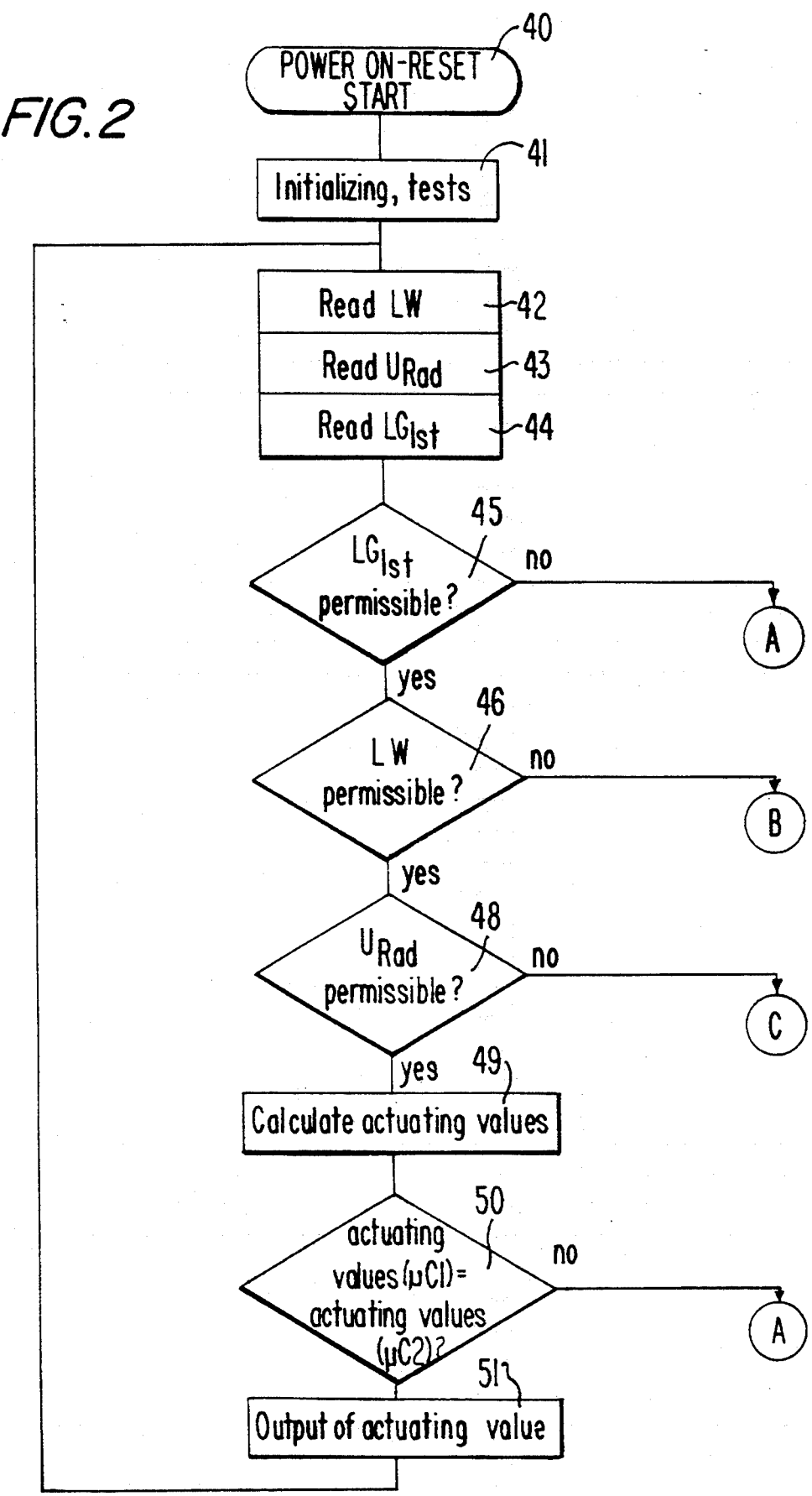
FIG. 2 shows a first embodiment example of a simple program structure for a main program to be run in the first microcomputer.

The flow chart shown in FIG. 2 illustrates the operating sequence of the main program in microcomputer 5. After the power-on reset 40, microcomputer 5 starts its main program. Initialization is effected in the first program step 41.

This step also contains tests for determined functional parts contained in microcomputer 5 or connected therewith, e.g. ROM, RAM, EEPROM, watchdog, and the connected valves, actuating members and retaining brake. Then, in program steps 42 and 43, the steering angle LW is read in by the steering angle transmitter 1 and the wheel speed value $U_{RAD}$ is read in by the connected wheel speed sensor 26. In program step 44, microcomputer 5 reads the actual position value $LG_{IST}$ of the rear axle actuator 8 from the displacement pickup 13. For this purpose, data must be exchanged between the two microcomputers 5, 17. If microcomputer 17 has not yet determined this value at that time, microcomputer 5 must first undergo several wait cycles and then repeat its request for the actual position value from microcomputer 17. In this way, a synchronization of the two microcomputers 5, 17 is achieved. The input transmitter values are checked in the subsequent interrogations.

When the computer detects an error in one of the transmitter values, the cause of the error source is not yet known. Various causes may have led to the error. On the one hand, the error may lie within the transmitter itself. On the other hand, it is possible that the error occurred in the signal chain from the transmitter to one of the microcomputers. Errors of this type also include EMC disturbance. A third possibility is that the error lies in one of the two microcomputers 5, 17. In the latter case, dependable operation of the four-wheel steering can no longer be ensured and the control of the rear axle must be interrupted momentarily. If the error lies in the transmitter and/or in the signal chain from the transmitter to one of the microcomputers 5, 17, an equivalent or substitute control and/or substitute functions in which this transmitter value is no longer used for calculating the actuating values can be carried out depending on the transmitter in question. To distinguish between these two sources of error after the error is detected, e.g. during the checking of a transmitter value, the microcomputer detecting the error branches into an emergency program B, C and the microcomputers 5, 17 are checked in this emergency program B, C by means of a data exchange. The check by data exchange primarily consists of a comparison of the actuating values and/or determined intermediate results calculated by the two microcomputers 5, 17. However, there are other possibilities for checking by data exchange. For example, certain register contents of the two microcomputers 5, 17 can also be exchanged and compared. Since an error in the microcomputer can be distinguished from other causes of error in this way, either the appropriate emergency program B, C can continue to run or the control of the rear axle can be interrupted. As switching off the control of the rear axle significantly alters the driving performance, a different "safer" emergency program B, C should be run as often as possible. This is made possible by the process described herein. In addition, errors caused by a defective microcomputer are not as common in practice as other error sources, so that it is not necessary to switch off the control of the rear axle every time an error is detected.

The actual position value is the first value to be compared with the predetermined threshold range in interrogation 45. If the actual position value does not lie within the predetermined reference value range, the main program branches to emergency program A in microcomputer 5. When an error is detected during the checking of the actual position value, safe driving operation with continued rear wheel steering can no longer be ensured and the rear wheel steering is immediately switched off in emergency program A. This is explained later in the description of FIG. 8.

In interrogation 46, the input steering angle value is likewise checked against the predetermined threshold range. If this interrogation 46 establishes that the range has been exceeded, the program jumps to another emergency program B. Since an error has been determined in the steering angle value, the system still has control over the actual position value of the rear axle actuator 8 if the error lies in the steering angle transmitter 1 and/or in the signal chain from the steering angle transmitter 1 to microcomputer 5. Accordingly, the rear axle actuator can still be shifted to the center position in a controlled manner in emergency program B. The driving performance of the motor vehicle will not change so abruptly as a result. Emergency program B is explained in more detail in the description of FIG. 6.

Interrogation 48 checks whether or not the input wheel revolution speed value lies in its predetermined reference value range. If not, the program branches to another emergency program C. If the error has its source in the wheel speed transmitter 26 and/or in the signal chain from the wheel speed transmitter 26 to microcomputer 17, control over the actual position value of the rear axle actuator 8 and over the steering angle deflection of the steering wheel is maintained. Therefore, actuating values for the rear axle actuator 8 can still be calculated from the read in steering angle values and supplied to the actuating member 7, 31 in emergency program C for a short time (in which the driving situation cannot change drastically). As a precaution, the checking of the actuating values for adjusting the rear axle actuator 8 is allowed to continue in this emergency program and to gradually subside over a determined period of time until the rear axle actuator 8 reaches the center position. Thus, the driving behavior of the motor vehicle changes less drastically than in emergency programs A and B.

There are other possible ways to check for error detection. For example, the gradients of the transmitter values can be subjected to a check, also in comparison with the gradients of the other transmitter values. If there are redundant transmitters, these may also be utilized in the check. Further, the information of certain transmitters can be compared with the information of other transmitters which detect quantities depending on the information of the first transmitters. For example, the transmitters for the wheel speed and the signal of a speedometer shaft both provide information on the speed of the motor vehicle. Another possibility for reliable detection of an error is to check the frequency of the errors determined in the comparisons and checks and to branch to emergency running as soon as determined frequency limits are exceeded. When checking to determine that the center position has been reached, it is advisable to let the rear axle actuator first pass over the center position several times without fixing it in the center position. When the rear axle actuator has practically ceased to swing around the center position, it can be fixed in this position. In this way it is possible to prevent an abrupt change in driving characteristics even on stretches of road with many curves. If no errors are detected in interrogations 45 to 48, the actuating values for adjusting the two actuating members 7 and 31 are calculated in step 49. The calculation is based on the input transmitter values. The computing functions vary depending on the driving situation. The calculated actuating values are compared with the calculated actuating values of microcomputer 17 in interrogation 50. Another data exchange between the two microcomputers 5, 17 is required for this purpose. In this case, the two microcomputers 5, 17 are synchronized as in program step 44. If the calculated values of the two microcomputers 5, 17 are different, an error is assumed in one of the microcomputers 5, 17 and emergency program A is run. Otherwise, the values calculated in the two microcomputers 5, 17 are averaged and supplied to the actuating members 7, 31. In the control device described here, the actuating values are only output through microcomputer 5. This construction is a result of the demand within the safety concept that the control apparatus only supply actuating values to the actuators when both computers 5, 17 are running properly. Accordingly, output need only be effected by one of the two microcomputers 5, 17. This takes place in program step 51. Once the program has run properly, program steps 42 to 51 are repeated in the same manner until the control device 25 is cut off from the voltage supply by switching off the ignition.

Figure 3:
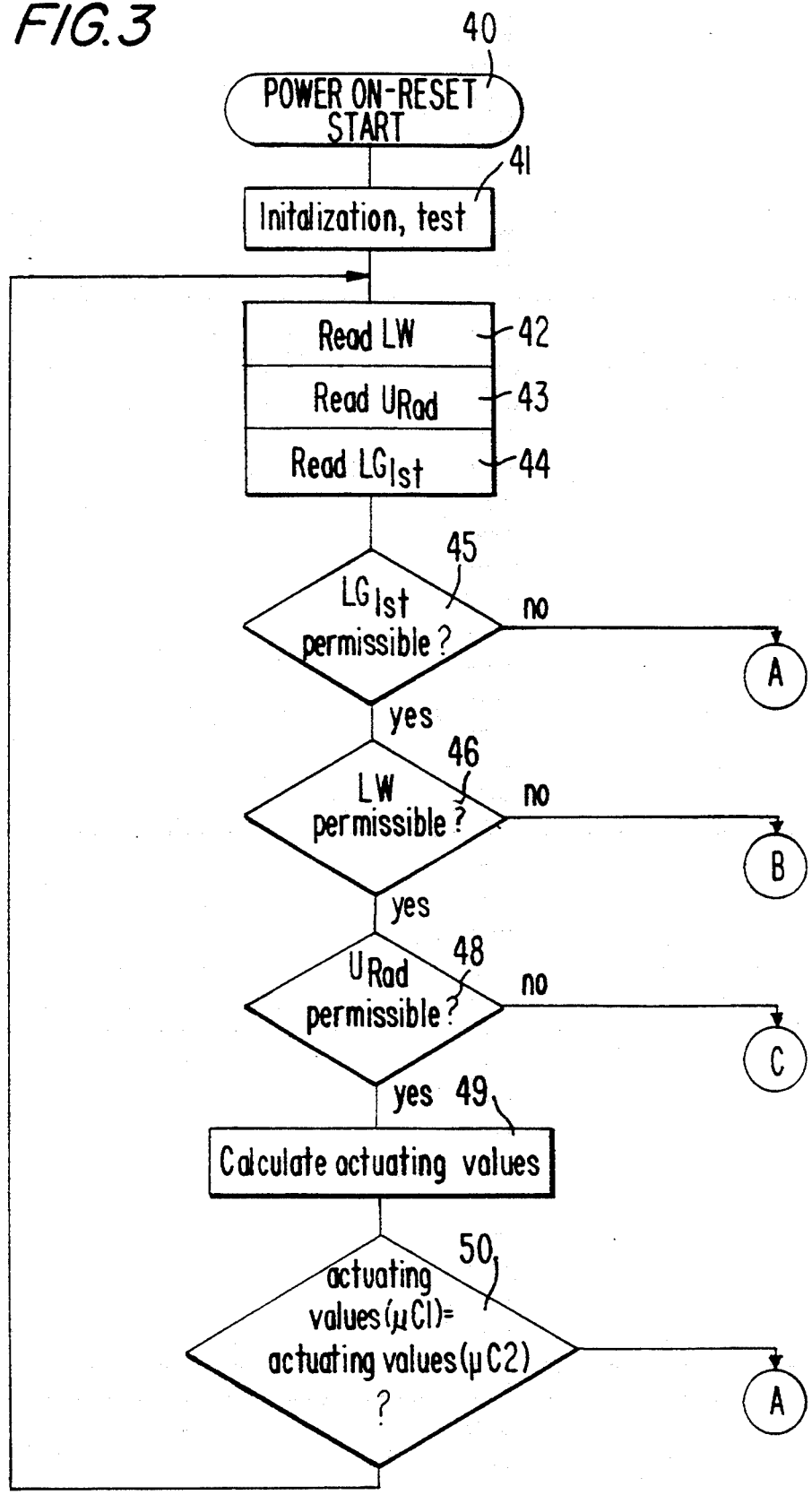
FIG. 3 shows the program structure of a main program to be run in the second microcomputer.

The flow chart shown in FIG. 3 will clarify the operating sequence of the main program in microcomputer 17. It is essentially identical to the structure chart in FIG. 2. The first program step after power-on/reset 40 is also program step 41 as in FIG. 2. Of course, the tests designated therein are now directed to the functional parts connected to microcomputer 17. However, the active testing of the two actuating members 7, 31 is omitted here, since the actuating members are only connected to microcomputer 5. The actual position value is then read in by the displacement pickup 13. This is effected in program step 44. The values for the steering angle and the wheel speed have been taken over by microcomputer 5 in program steps 42 and 43. The data exchange required for this purpose corresponds to that in program step 44 in FIG. 2. The read in values are checked in exactly the same manner as in the structure chart in FIG. 2 by interrogations 45 to 48. However, it should be noted that emergency programs B and C are contained in microcomputer 17. Emergency program A is identical to emergency program A in FIG. 2, but is also contained in microcomputer 17. After the interrogations, the actuating values are also calculated as in program step 49 in FIG. 2. In this case, the actuating values determined by the two microcomputers 5, 17 are also checked after the data exchange of the calculation results as in program step 50 in FIG. 2. In this case, also, if the calculation results do not correspond, emergency program A is run. In the event of correct operation, program steps 42 to 50 are repeated. Again, this is effected until the control device is cut off from the power supply.

Figure 4:
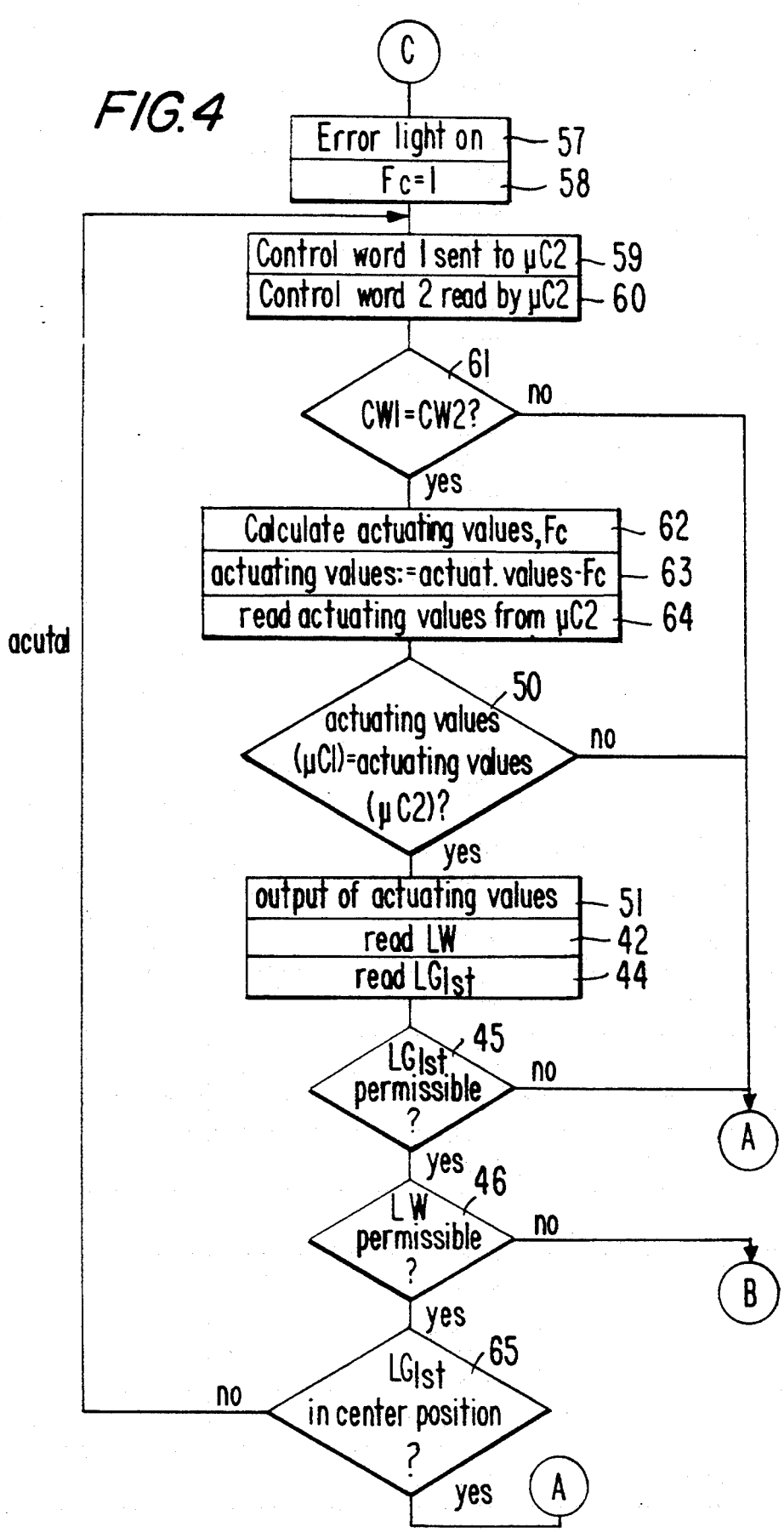
FIG. 4 shows the program structure of a first emergency program for running in the first microcomputer.

The flow chart in FIG. 4 serves to illustrate emergency program C in microcomputer 5. In the first program step 57, the error light 21 is turned on. In the following program step 58, a variable is set to the value of 1. In the next program step 59, microcomputer 5 sends a special data word to microcomputer 17. This data word informs microcomputer 17 that microcomputer 5 as detected an error and has run emergency program C. Microcomputer 17 then sends its check word or control word back to microcomputer 5. The control word is received by microcomputer 5 in program step 60. In interrogation 61, the control word sent to microcomputer 17 is compared with the control word received by microcomputer 17. If the control words do not match, microcomputer 5 interprets this to mean that an error exists in one of the microcomputers 5, 17 and carries out the emergency cut-off by running emergency program A. This check determines whether or not both computers are running the same emergency program. In program step 62, the regular calculation of the actuating values for the actuators is carried out. This takes place according to the same computing steps as those in the main program in microcomputer 5, but without using the information from the wheel speed transmitter in which an error has been detected. This calculation is based on the read in transmitter values for the steering angle and actual position value. The results of the calculation are multiplied in program step 63 by a time-dependent factor. This factor was set to 1 in program step 58. A new calculation is carried out in program step 62 depending on the intervening period of time. A gradual damping of the steering amplitudes at the rear axle is achieved by multiplying the calculated actuating values by a factor changing from 1 to 0 over time. The operator of the motor vehicle can accustom himself to the changed driving behavior of his vehicle by means of this substitute control. In program step 64, the actuating values which were calculated in the same way in the other microcomputer 17 are transmitted to microcomputer 5 by exchanging data via the bus connection 11. In the following interrogation 50, the computation results of the two computers 5, 17 are compared. If the results do not match, an error must exist in one of the microcomputers 5, 17, whereupon an emergency cutoff is initiated by running emergency program A. If both computers supply the same results, the error must lie in the wheel revolution sensor 26 and/or in the signal chain from the wheel revolution sensor 26 to microcomputer 5 and emergency program C can continue to run. The actuating values determined by the two computers 5, 17 are then averaged in program step 51 and supplied to the actuating members 7, 31. In program step 42, the steering angle is read in as in the main program. In program step 44, the actual position value is taken over by microcomputer 17 as in the main program. After this, the ranges of the actual position value and steering angle value are checked as in the main program (interrogations 45 and 46). In program step 65, the actual position value is additionally checked to determine whether or not the center position of the rear axle actuator 8 has been reached. If this center position has been reached, the control of the actuating member is switched off by running the emergency program A. When checking on the center position it is advisable to allow the rear axle actuator to pass over the center position several times without fixing it in the center position. The rear axle actuator can be fixed in the center position once it has virtually ceased to swing over this center position. Accordingly, there is no abrupt change in the driving characteristics even on stretches of road with many curves. This concludes emergency program C and the vehicle is steered only by front-wheel steering from this point. Four-wheel steering can be activated again only after ignition on/off and test.

If the center position has not yet been achieved, program steps 59 to 65 are repeated until the center position is reached. When the ignition is switched off, the data words characterizing the errors may be stored together with the relevant operating data in a storage area so that they are available for subsequent diagnosis by diagnostic equipment in a workshop.

Figure 5:
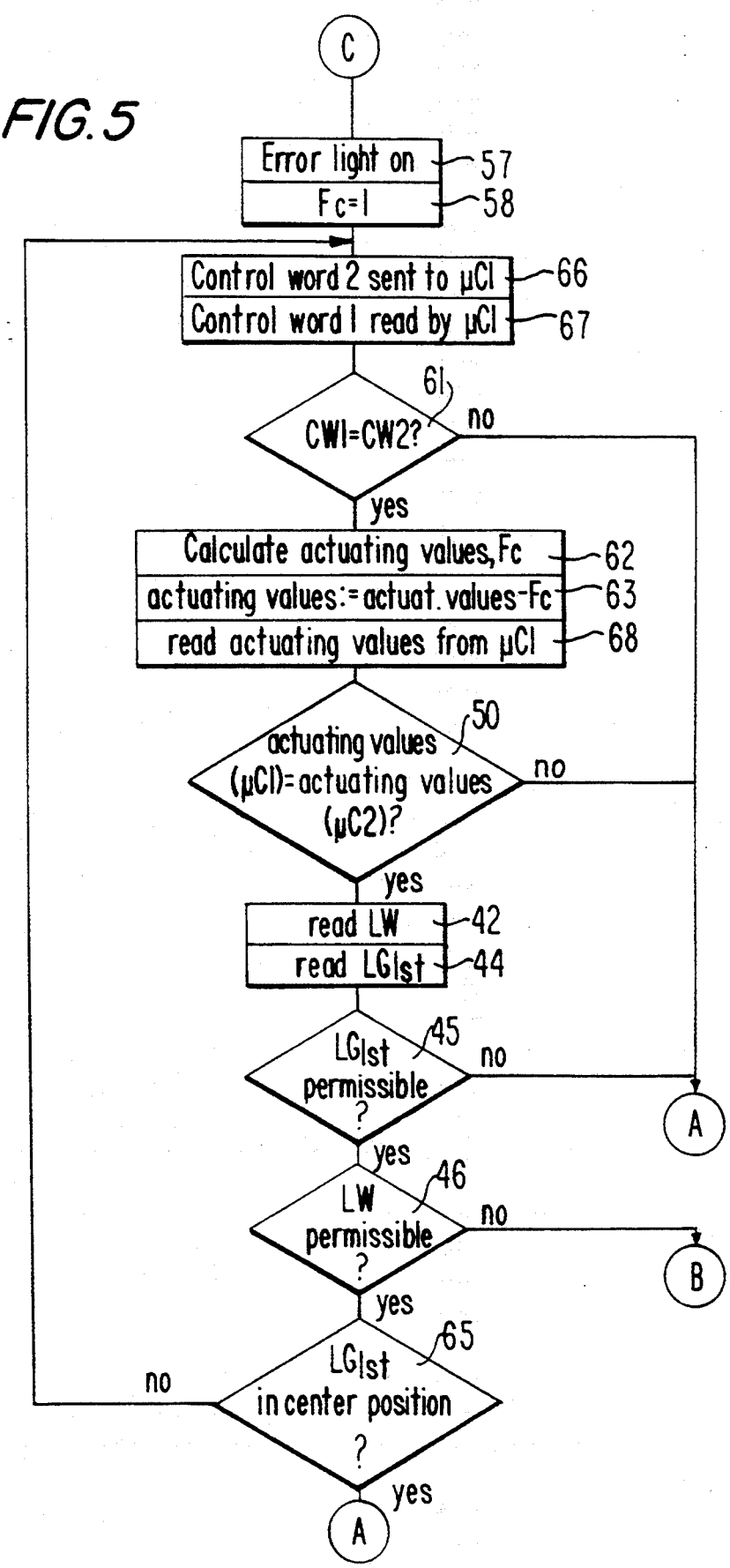
FIG. 5 shows the program structure of a first emergency program for running in the second microcomputer.

FIG. 5 shows the flow chart for emergency program C in microcomputer 17. Program steps 57 and 58 are identical to program steps 57 and 58 in FIG. 4. In program step 66, microcomputer 17 sends its control word to microcomputer 5. In program step 67, microcomputer 17 reads the control word of microcomputer 5. Interrogation 61 checks for a match between the two control words as in program step 61 in FIG. 4. The actuating values are calculated in program steps 62 and 63 as in programs steps 62 and 63 in FIG. 4. In program step 68, microcomputer 17 reads the actuating values calculated by microcomputer 5 in the same manner as in program step 64 in FIG. 4. The following program steps correspond to those of the structure chart of FIG. 4, apart from the omission of program step 51 for the output of the actuating values. Moreover, the corresponding emergency programs are called up in microcomputer 17 instead of in microcomputer 5.

Figure 6:
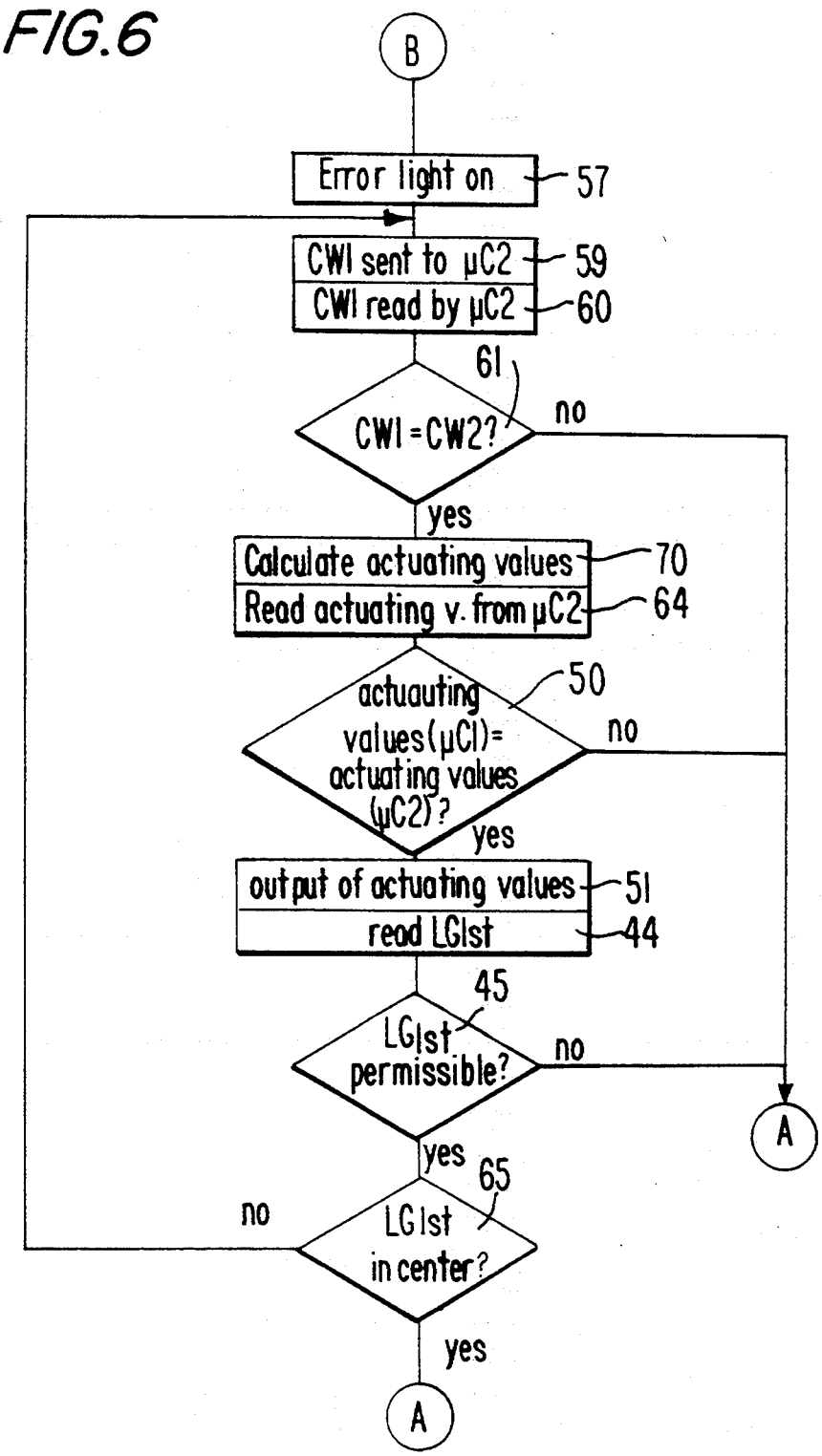
FIG. 6 shows the program structure of a second emergency program for running in the first microcomputer.

Emergency program B of microcomputer 5 is described in the following with reference to the structure chart in FIG. 6. Emergency program B is another emergency running program which enables a gentle switching off of the rear wheel steering when an error has been detected. The error light is switched on in program step 57. In program steps 59 and 60, the control words for this emergency program are exchanged as in the corresponding program steps in emergency program C in FIG. 4 and are compared with one another in program step 61. The essential difference over emergency program C consists in that the actuating values are calculated without the information of the transmitter signals. In this case, the rear axle actuator 8 is adjusted in the direction of tile center position, e.g. at a speed of 0.5 meters/sec. The calculations required for this are carried out in program step 70. In program step 64, the actuating values calculated by microcomputer 17 are read in and compared with one another in program step 50 as in emergency program C in FIG. 4. The output of the actuating values is then carried out in program step 51 and the actual position value is read in by microcomputer 17 in program step 44 and checked in interrogation 45. Interrogation 65 serves to detect the center position of the rear axle actuator 8. If the center position has not yet been reached, program steps 59 to 65 are repeated. When the center position is reached, the control is switched off by running emergency program A. As in emergency program C, the four-wheel steering can be reactivated only after the ignition on/off and after the tests have been run.

Figure 7:
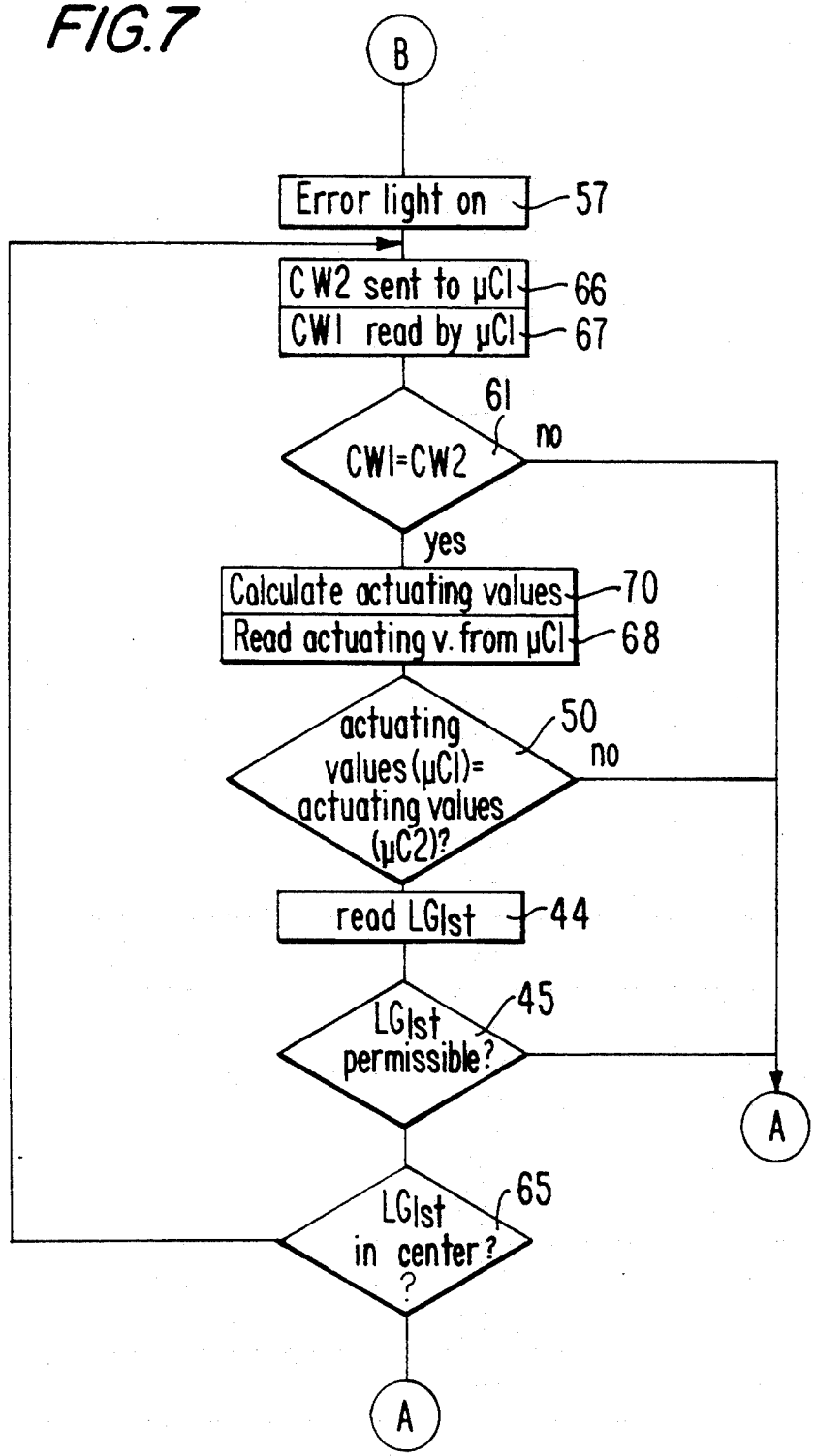
FIG. 7 shows a program structure of a second emergency program for running in the second microcomputer.

The structure chart for emergency program B in microcomputer 17 is run through in a corresponding manner. It is shown in FIG. 7. It differs from emergency program B in FIG. 6 in that there is no output of actuating values, in that the control word is sent to microcomputer 5 in program step 66 and the control word is read by microcomputer 5 in program step 67, and in that the calculated values of microcomputer 5 are read in program step 68.

After running emergency program B or C, further developments of the process other than switching off the rear wheel steering control are also possible. For example, after running an emergency program, the rear wheel steering control can be switched back on again when the speed falls below a certain threshold. This may be effected, for example, similarly to emergency program C, i.e. in that the steering amplitudes are gradually increased over a certain period of time until the steering amplitudes are calculated again as in the main program. Naturally, additional error checks must take place in this phase, which would cause a shutdown again if an error were detected.

Figure 8:
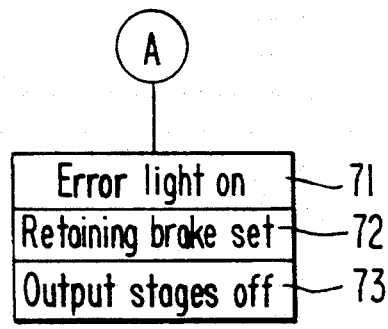
FIG. 8 shows a program structure of a third emergency program for running in both microcomputers by which the control of the rear axle actuator is switched off.

FIG. 8 shows the structure chart for emergency program A. This structure chart applies to both computers. Program steps 71, 72 and 73 are run through in this emergency program. Program step 71 switches on the error light 21. In program step 72, the retaining brake 9 is activated by the respective microcomputer 5, 17. The output stages 6, 30 are then shut off by the controllable relays 18, 32 in program step 73. The output stages can then be switched on by the main program after ignition off/on and after successfully passing the safety tests.

A second embodiment example for a main program for running in microcomputers 5, 17 is described in the following. The construction of the control device for the second embodiment example corresponds to that of the first embodiment example to a great extent. However, in this case, several sensors, e.g. the transmitter 13 for the actual position value of the actuating member 8, the transmitter 1 for the steering angle, are duplicated, one of the two transmitters being connected to microcomputer 5 and the other being connected to microcomputer 17. All sensors connected to microcomputer 5 form a first group of transmitters. All of the sensors connected to microcomputer 17 form a second group of transmitters.

The operation of microcomputer 5 is explained in the following with reference to the structure chart in FIG. 9. After the program start 80, there is an initializing phase for the control device as in the first embodiment example. In the next program step 82, the transmitter signals of all transmitters connected to microcomputer 5 are detected. The determined measured values are sent to microcomputer 17 in program step 83. Microcomputer 5 then takes over the measurements determined by microcomputer 17. That is, there is an exchange of measured values between the two microcomputers 5 and 17 in program step 83. At the same time, the two microcomputers are synchronized by this exchange of measured values. In the following program step 84, the determined measured values are checked. Various testing criteria are interrogated in this consistency check. More exact details on the testing criteria are explained at greater length in the description of the structure chart for the main programs.

As a result of the consistency check, a decision is made as to whether or not the main program can continue to run and, if not, which of the three different emergency programs is to be run. The results of the consistency check are exchanged between the two microcomputers 5, 17 in program step 85. Subsequently, an inquiry is made in interrogation 86 as to whether or not the two computers have arrived at the same test results. If not, emergency program A is run, as was described in the first embodiment example. If the test results of both microcomputers 5, 17 match, three interrogations 87, 88 and 89 take place. In interrogation 87, the test results are analyzed to determine whether emergency program A should be run. If so, the program jumps to emergency program A. In interrogation 88, the test results are analyzed to determine whether or not it is necessary to run emergency program B. If so, emergency program B is run. Finally, in interrogation 89, the test results are analyzed to determine whether it is necessary to run emergency program C. If so, emergency program C is run. If the consistency check on the measurement values of the two microcomputers shows that there is no need to run an emergency program, the main program continues. The actuating values are then calculated in program step 90 based on the detected transmitter signals.

In program step 91, the calculated actuating values are exchanged between the two microcomputers 5, 17. The two microcomputers are again synchronized in so doing. In interrogation 92, the exchanged actuating values are compared. If the actuating values do not match, it is assumed that a serious error has occurred and microcomputer 5 branches to emergency program A. If the actuating values match, the position is adjusted in program step 93. In so doing, microcomputer 5 generates control signals for the actuators 7, 31 of the actuating member 8, which control signals correspond to the calculated actuating values. When the position has been adjusted, a correctly operating control cycle has been completed. The next control cycle is then started with the detection of the transmitter signal in program step 82.

Figure 9:
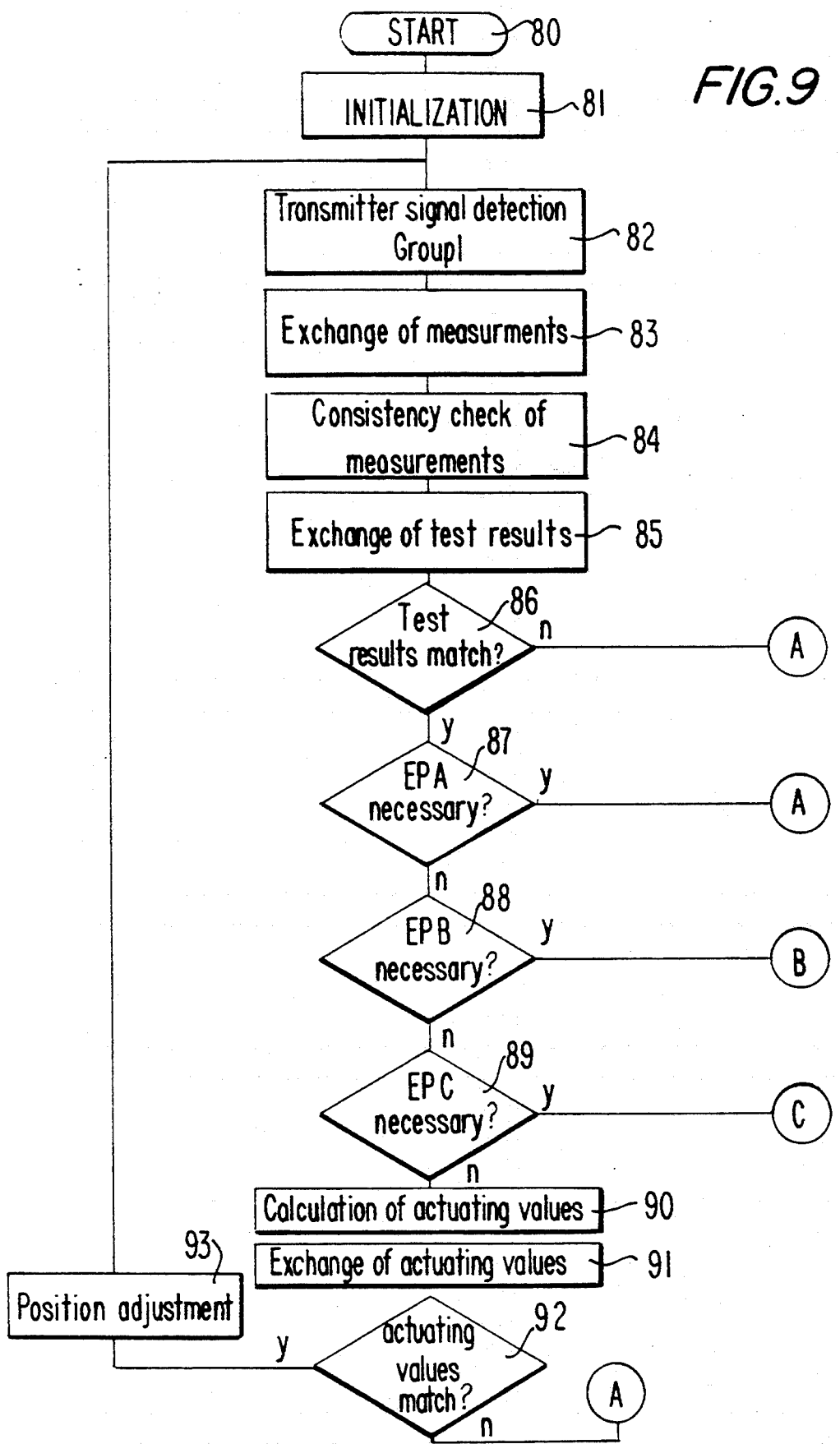
FIG. 9 shows a second embodiment example for a structure chart of a main program for running in the first microcomputer.
Figure 10:
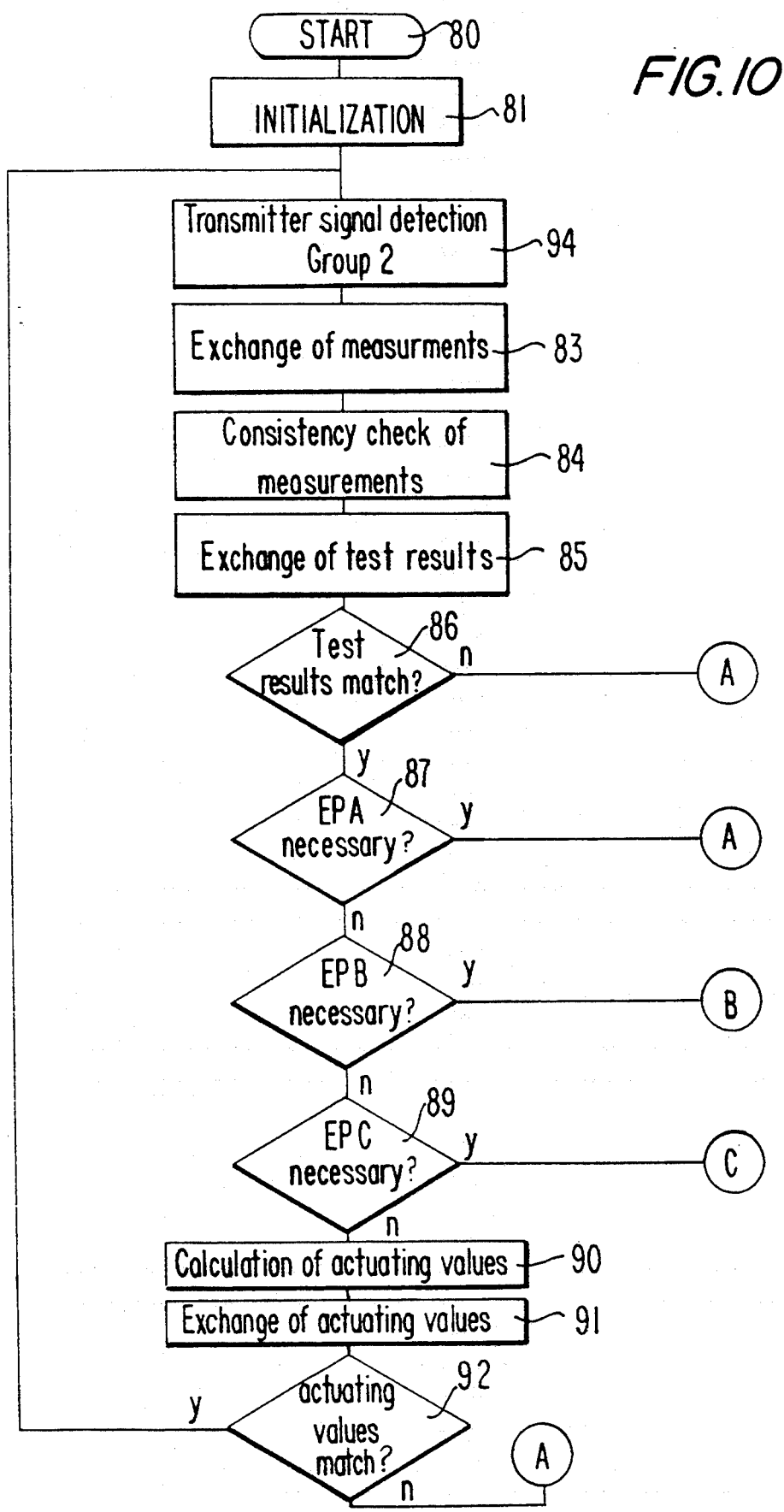
FIG. 10 shows a second embodiment example for a structure chart of a main program for running in the second microcomputer.

FIG. 10 shows the structure chart of the structure chart corresponding to FIG. 9 for the main program to be run in microcomputer 17. It substantially corresponds to the structure chart in FIG. 9. It differs from the latter in that the transmitters connected to microcomputer 17, i.e. transmitter group 2, are detected in program step 94. The same program steps 83 to 92 as in microcomputer 5 are then run. Program step 93, in which the position is adjusted, is omitted for the main program of microcomputer 17, since microcomputer 17 is not designed for regular control of the actuators 7, 31 of the actuating member 8.

The consistency check of the measured values in program step 84 of each structure chart in FIGS. 9 and 10 is discussed in more detail in the following.

When an error occurs, a signal changes fundamentally in finite time so that a value which is characterized at first, apart from its deviation, e.g., from a redundant transmitter signal, only by a gradient which is too large can also be measured before the permissible signal range is exceeded. As a rule, (e.g. in the event of a break in a wire or a short circuit) this is followed by an exceeding of the permissible signal range (out of range). Accordingly, the error pattern of a sensor consists of a final state of the erroneous signal sufficiently long after the occurrence of the error and the sequence of identical or different instances of loss of plausibility directly after the occurrence of an error.

Various criteria are examined during the consistency check to determine the existence of an error. The first criterion is whether or not the determined measurement lies within the permissible range of measurements for the transmitter in question. The second criterion is whether or not a transmitter signal changes at a speed which is impossible (not permissible) in practice. For this purpose, the current measured value of the transmitter must be compared with the previously determined measured value. Thus, an excessive change in a transmitter signal is already an early indication of the existence of an error, even if the permissible measurement range for the transmitter signal has not yet been exceeded.

A further criterion for the presence of an error is an excessive discrepancy between the measured values of two identical sensors, one of which is redundant. This criterion also already indicates the presence of an error, even if the transmitter signals still lie within the permissible measurement range.

In many cases, exact information concerning the error may be obtained already by including not only the current measured values but also the preceding measured values in the error analysis. For example, it can be concluded from the following time sequence discrepancy between two values of identical transmitters plus an excessively large gradient of the transmitter values discrepancy between two values of identical transmitters plus a value lying outside the permissible measurement range and a discrepancy between two values of identical transmitters plus a transmitter value outside the permissible measurement range that the signal with the excessively large gradient or the impermissible signal value is erroneous, but that the other signal is correct and can accordingly continue to be used (at least temporarily). Based on the error information, the appropriate emergency measure is selected and initiated. The information of the transmitter detected as defective is then no longer used for controlling the actuating member.

To prevent the triggering of an emergency program for very brief disturbances (e.g. EMC), a plurality of successive signal values are evaluated. Therefore, the time sequence of the losses in plausibility (not necessarily identical) are used to decide which emergency programs to run.

The selected duration or number of immediately consecutive losses in plausibility before an emergency measure is triggered must be large enough to bridge brief disturbances. On the other hand, particularly in very dynamic systems, emergency measures must be instituted as quickly as possible, i.e. the error reaction time must be minimized. For this purpose, different instances of lost plausibility are evaluated by the present invention as identical errors when they are attributable to an identical cause.

Some hypothetical signal curves of two identical transmitters for the actual position value of the actuating member 8 are used as examples in the following. The information concerning the actual position value is duplicated once in the steering system. The transmitter values are detected cyclically in each microcomputer 5, 17 (e.g. every millisecond).

FIG. 11 shows the first two signal curves $x_1$, $x_2$ for the two transmitters. The permissible measurement range for the actual position transmitter lies between 0.5 and 4.5 volts. The maximum permissible deviation between the two measurements is set at 0.2 volts. The maximum permissible rate of change of an actual position value is 15 v/s. Before running an emergency program, three consecutive errors must be detected. An error occurs at time $t_F$. The following error pattern is given for microcomputers 5, 17 in the case of the following detected signals at times $t_1$, $t_2$, $t_3$ (see table 1).

|  | $t_1$ | $t_2$ | $t_3$ |
| --- | --- | --- | --- |
| $x_1$ | no error | no error | no error |
| $x_2$ | gradient too large | measurement range exceeded | measurement range exceeded |
| $(x_1-x_2)$ | deviation too large | deviation too large | deviation too large |

Based on this error pattern, microcomputers 5, 17 determine that transmitter $x_2$ is defective, but transmitter $x_1$ can continue to be used.

In FIG. 12, an error again occurs at time $t_F$. The following error pattern emerges for the microcomputers from the detected signals at times $t_1$, $t_2$, $t_3$ (see table 2):

|             | $t_1$              | $t_2$              | $t_3$                       |
| ----------- | ------------------ | ------------------ | --------------------------- |
| $x_1$       | no error           | no error           | no error                    |
| $x_2$       | no error           | no error           | measurement range exceeded  |
| $(x_1-x_2)$ | deviation too large | deviation too large | deviation too large        |

Based on this error pattern, the two microcomputers 5, 17 determine that transmitter $x_2$ is defective but that transmitter $x_1$ can continue to be used.

In the signal curves according to FIG. 13, the following error pattern results for the two microcomputers 5, 17 after signal detection (see table 3):

|             | $t_1$              | $t_2$              | $t_3$              |
| ----------- | ------------------ | ------------------ | ------------------ |
| $x_1$       | no error           | no error           | no error           |
| $x_2$       | no error           | no error           | no error           |
| $(x_1-x_2)$ | deviation too large | deviation too large | deviation too large |

Based on this error pattern, the two microcomputers cannot identify the error. They therefore initiate emergency program A to achieve a safe state.

Figure 14:
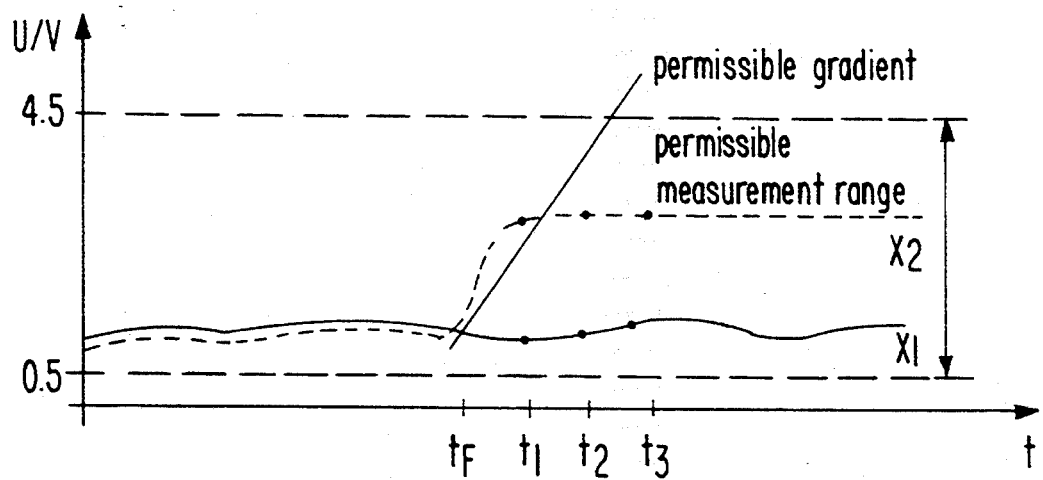
FIGS. 14 and 15 show the signal curves of two transmitters for the actual position value of an actuating member at tile fourth occurrence of an error.
Figure 15:
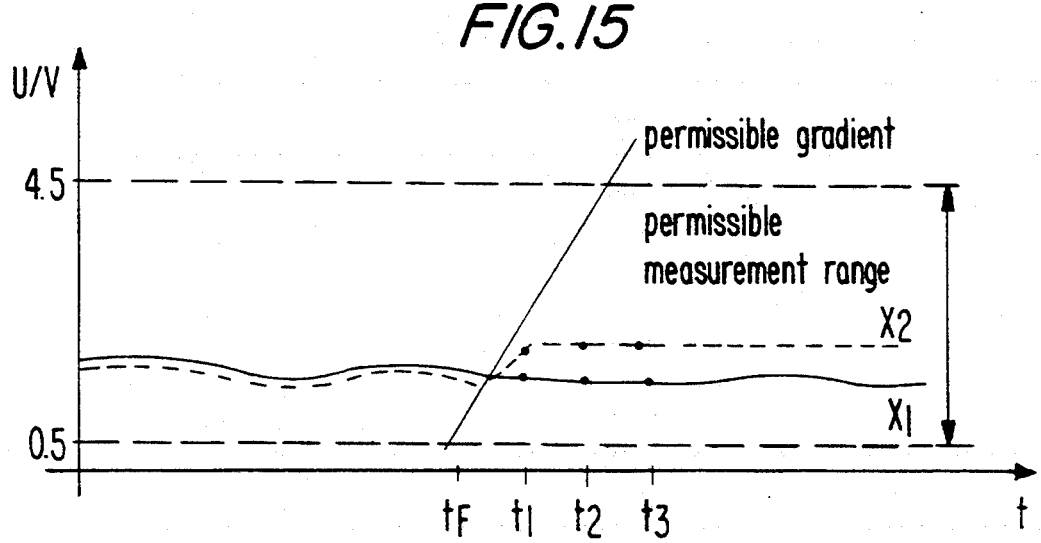

A fourth example for the signal curves of the actual position transmitter is shown in FIG. 14. Based on these signal curves, the following error pattern results for the two microcomputers 5, 17 (see table 4):

|             | $t_1$              | $t_2$              | $t_3$              |
| ----------- | ------------------ | ------------------ | ------------------ |
| $x_1$       | no error           | no error           | no error           |
| $x_2$       | gradient too large | no error           | no error           |
| $(x_1-x_2)$ | deviation too large | deviation too large | deviation too large |

Based on this error pattern, signal $x_2$ is detected as defective and signal $x_1$ can be used further.

This error analysis is also suitable in principle for sensors having no direct redundancy. The detected transmitter signals of transmitters carrying equivalent information can be monitored for permissible gradients or values exceeding the range. Thus, a decision may also be made in this case about which signal path may definitely be classified as defective. To decide which emergency program to run after three errors have been detected, microcomputers 5, 17 also evaluate the importance of the sensor detected as defective during the consistency check. The following sensors are used for controlling rear wheel steering:

two actual position transmitters which detect the position of the actuating member,
two steering angle transmitters which detect the rotational angle of the steering wheel,
a transmitter for the vehicle speed (for example, this includes transmitters which detect the rotation of a speedometer shall, but wheel revolution sensors such as those used in anti-lock braking systems can also be used for the same purpose; the speedometer shaft transmitter then serves as a redundant transmitter either for the wheel speed of one wheel or for the mean value of the two wheel revolution speeds of the two wheel speed sensors),
transmitters for the loading status of the vehicle,
transmitters for information about whether or not reverse gear is engaged,
transmitters for the yaw speed of the vehicle,
transmitters for the transverse acceleration of the vehicle,
transmitters for the crosswind effect on the vehicle,
transmitters for the inclination of the vehicle body.

Knowledge of the actuator position is always required for regulating the movement of the actuator. Thus, when a defect occurs in this sensor, a controlled actuator movement is no longer possible and only substitute function A can be used. The steering angle transmitter takes into account the dynamic steering state of the vehicle. If it is not definitely known which individual signal is still working correctly, it is not possible to steer the rear wheels synchronously with the front axle. However, if the actual position transmitter does not fail at the same time, substitute function B may be carried out. Dynamic changes in the driving speed, loading state and forward/reverse drive occur only gradually. Values measured and stored immediately before the occurrence of an error remain valid for a relatively long time and do not impede synchronous steering of the rear axle. For example, the loading state of the vehicle and shifting between forward and reverse gears change only when the vehicle is stationary. The driving speed changes at a maximum acceleration of 1 g and the safety of the vehicle is not jeopardized when a vehicle speed is incorrectly assumed to be too great. Accordingly, substitute function C is also possible when none of the signals is definitely detected as still usable.

In conclusion, the following table 5 shows which emergency programs are run by the respective microcomputer when an individual signal of the specific transmitter is considered still usable/not usable.

|                       | individual signal usable | individual signal not usable |
| --------------------- | ------------------------ | ---------------------------- |
| actual position value | C                        | A                            |
| steering angle        | C                        | B                            |
| driving speed         | C                        | C                            |
| loading state         | C                        | C                            |
| reverse gear          | C                        | C                            |

The described process for error recovery in electronic control devices can be modified in many ways. Thus, it is not absolutely necessary to provide two or more microcomputers for the control device. With reduced safety requirements it is also possible to provide just one microcomputer.

We claim:

1. Process for error recovery in electronic control devices for controlling parts of an apparatus, said electronic control devices including at least one microcomputer, transmitter means for generating transmitter signals containing information regarding said parts of said apparatus, said transmitter means comprising a plurality of transmitters including duplicate transmitters and said transmitter means being connected to said at least one microcomputer to transmit said transmitter signals to said at least one microcomputer, at least one actuating member, at least one actuator connected to said at least one actuating member and connected to said microcomputer so that said at least one actuating member is controllable by said at least one microcomputer via said at least one actuator, at least one safety device connected to said at least one actuator and said at least one microcomputer, wherein said at least one microcomputer includes at least one main program means for controlling said at least one actuating member, at least two emergency program means for controlling said at least one actuating member and means for deciding which of said program means is to control said at least one actuating member, said process including the steps of:
- a) detecting said transmitter signals from said transmitters in said at least one main program means in said at least one microcomputer;
- b) calculating values from said transmitter signals detected in step a);
- c) checking at least one of said values calculated in step b) and said transmitter signals detected in step a) for consistency;
- d) adjusting said at least one actuating member by generating control signals for control of said at least one actuating member at least partly using said values calculated from said transmitter signals and feeding said control signals to said at least one actuator which controls said at least one actuating member at least partially using said control signals;
- e) deciding which of said program means is to be run based on said checking in step c);
- f) activating said at least one safety device with a first one of said at least two emergency program means to interrupt control of said at least one actuator by said main program means when said first emergency program means is selected in said deciding step e);
- g) continuing to detect said transmitter signals in a second one of said at least two emergency program means and calculating other values from said transmitter signals detected in said second emergency program means when activated;
- h) Checking said other values calculated in step g) for consistency;
- i) multiplying said other values calculated in step g) by a factor which decreases as time proceeds during operation of said second emergency program means so as to achieve a gradual damping of said at least one actuating member; and
- j) generating other control signals for at least partially controlling said at least one actuating member from said other values multiplied by said factor in step i) and supplying said other control signals to said at least one actuator, so that said other values calculated in step g) at least in part act to adjust said at least one actuating member via said at least one actuator.

2. Process as defined in claim 1, wherein said checking of said values calculated from said transmitter signals comprises comparing said transmitter signals with predetermined values to determine if said transmitter signals are within a permissible signal range or not.

3. Process as defined in claim 1, wherein said checking of said values calculated from said transmitter signals comprises comparing a rate of change of said values with predetermined rate parameters.

4. Process as defined in claim 1, wherein said checking of said transmitter signals for consistency includes comparing said transmitter signals of said duplicate transmitters with said transmitter signals not from said duplicate transmitters.

5. Process as defined in claim 1, wherein said checking of said transmitter signals for consistency includes comparing said transmitter signals with said values containing equivalent information.

6. Process as defined in claim 1, wherein during said checking for consistency errors are detected, and further comprising counting said errors to determine the number of said errors and operating one of said emergency program means only if the number of said errors exceeds a predetermined number.

7. Process as defined in claim 1, further comprising activating said at least one safety device during operation of said second emergency program means and interrupting control of said at least one actuator for adjusting said at least one actuating member.

8. Process as defined in claim 1, wherein said at least one microcomputer includes a third emergency program means for calculating additional values for adjusting said at least one actuating member, and further comprising calculating said additional values with said third emergency program means without information from said transmitter signals.

9. Process as defined in claim 8, wherein said third emergency program means determines a location of said at least one actuating member, and further comprising detecting a center position of said at least one actuating member with said third emergency program means and operating said third emergency program means to control said at least one actuating member when said center position is detected.

10. Process as defined in claim 1, wherein said parts are rear wheels of a motor vehicle.

11. Apparatus for controlling steering of motor vehicle rear wheels comprising:
- at least one actuating member for adjusting a steering angle of rear wheels of a motor vehicle;
- a retaining brake connected with said at least one actuating member as a safety device for said at least one actuating member;
- at least one actuator connected to said at least one actuating member and including means for controlling said at least one actuating member;
- at least one transmitter means for generating at least one transmitter signal for a steering angle, a driving speed and wheel speeds of one of said rear wheels and other wheels of said motor vehicle;
- at least one other transmitter means for generating at least one other transmitter signal for at least one actual position of said at least one actuating member of said motor vehicle;
- at least two microcomputers, each of said at least two microcomputers containing at least one main program means for controlling said at least one actuating member, at least two emergency program means for controlling said at least one actuating member and means for deciding which of said program means is to be operated; and
- wherein said at least one main program means includes means for detecting said at least one transmitter signals from said at least one transmitter means and said at least one other transmitter signals from said at least one other transmitter means, means for calculating values from said at least one transmitter signal and said at least one other transmitter signal detected by said means for detecting, means for checking at least one of said values and said at least one transmitter signals for consistency, means for adjusting said at least one actuating member by generating control signals and means for feeding said control signals to said at least one actuator for control of said at least one actuating member based at least partially on said checking, and wherein a first one of said at least two emergency program means in said at least one microcomputer includes at least one safety means for interrupting control of said at least one actuator for adjusting said at least one actuating member and a second one of said at least two emergency program means includes means for detecting said transmitter signals, means for calculating other values from said transmitter signals, means for adjusting said at least one actuating member based at least partially on said other values of said transmitter signals, means for checking at least one of said transmitter signals and said other values for consistency, means for multiplying said other values by a factor decreasing with increasing time from a start of operation of said second emergency program means for gradual damping of an actuating amplitude of said at least one actuating member, and wherein at least one of said at least two microcomputers continues to generate control signals according to said other values multiplied by said factor and feed them to said at least one actuator for control of said at least one actuating member.

12. Apparatus as defined in claim 11, wherein said at least one transmitter means for said steering angle includes duplicate transmitters for said steering angle, and said at least one other transmitting means for an actual position includes duplicate transmitters for said actual position, and each of said duplicate transmitters for said actual position is connected to a different one of said at least two microcomputers and each of said duplicate transmitters for said steering angle is connected to a different one of said at least two microcomputers.

13. Apparatus as defined in claim 12, wherein said at least two microcomputers contain means for activating said first emergency program means when said means for checking in said at least two microcomputers detect that none of said duplicate transmitters for said actual position value of said at least one actuating member is operating correctly.

14. Apparatus as defined in claim 12, wherein said at least two microcomputers contain means for activating said first emergency program means when said means for checking in said at least two microcomputers detect that said duplicate transmitters for said actual position value of said at least one actuating member produce output signals deviating from each other beyond a predetermined extent.

15. Apparatus as defined in claim 12, wherein said at least two microcomputers include a third emergency program means when at least one of said means for checking in said at least two microcomputers detects that none of said duplicate transmitters for said steering angle are operating correctly.

16. Apparatus as defined in claim 11, further comprising a power supply for said at least one actuator, and wherein said safety means for interrupting control of said at least one actuator includes means for interrupting a power supplied by said power supply to said at least one actuator.

17. Apparatus as defined in claim 16, wherein said means for interrupting power includes at least one relay connected between said power supply and said at least one actuators, said at least one relay being connected to at least one of said microcomputers having means for control of said relay to open or close said relay.

18. Apparatus as defined in claim 11, further comprising an error indicator connected to said at least two emergency program means, and wherein each of said at least two emergency program means include means for activating said error indicator when activated.

19. Apparatus as defined in claim 10, wherein said at least two of said at least two microcomputers includes different program means for checking at least one of said transmitter signals and said values.

20. Apparatus as defined in claim 19, wherein each of said at least two microcomputers has a different semiconductor structure.

21. Apparatus as defined in claim 11, wherein each of said at least two microcomputers contains monitoring circuit means for monitoring other ones of said at least two microcomputers to receive monitoring signals therefrom and means for interrupting control of said at least one actuator adjusting said at least one actuating member in an absence of said monitoring signals from any one of said others of said at least two microcomputers.

22. Apparatus as defined in claim 11, further comprising a dual-port RAM connected to said at least two microcomputers.

* * * * *